US009973011B2

(12) United States Patent
Park et al.

(10) Patent No.: US 9,973,011 B2
(45) Date of Patent: May 15, 2018

(54) BATTERY MANAGEMENT UNIT AND METHOD FOR SETTING IDENTIFIER BY USING FREQUENCY MODULATION

(71) Applicant: LG CHEM, LTD., Seoul (KR)

(72) Inventors: Jong-Min Park, Daejeon (KR); Jin-Seok Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 169 days.

(21) Appl. No.: 15/117,490

(22) PCT Filed: Feb. 24, 2015

(86) PCT No.: PCT/KR2015/001767
§ 371 (c)(1),
(2) Date: Aug. 9, 2016

(87) PCT Pub. No.: WO2015/126225
PCT Pub. Date: Aug. 27, 2015

(65) Prior Publication Data

US 2016/0352109 A1 Dec. 1, 2016

(30) Foreign Application Priority Data

Feb. 24, 2014 (KR) ........................ 10-2014-0021282
Feb. 24, 2015 (KR) ........................ 10-2015-0025843

(51) Int. Cl.
*H02J 7/00* (2006.01)
*B60L 3/12* (2006.01)
*B60L 11/00* (2006.01)

(52) U.S. Cl.
CPC .............. *H02J 7/0014* (2013.01); *B60L 3/12* (2013.01); *B60L 11/007* (2013.01); *H02J 7/00* (2013.01);
(Continued)

(58) Field of Classification Search
CPC ..................................................... H02J 7/0068
(Continued)

(56) References Cited

U.S. PATENT DOCUMENTS 6,078,165 A * 6/2000 Ashtiani ............... H02J 7/0021 320/116
7,734,317 B2 * 6/2010 Patel ..................... H02J 7/0013 320/129
(Continued)

FOREIGN PATENT DOCUMENTS

EP 2408053 A2 1/2012
JP 2010-141971 A 6/2010
JP 5091219 B2 12/2012
KR 10-0826096 B1 4/2008
(Continued)

OTHER PUBLICATIONS

International Search Report (PCT/ISA/210) issued in PCT/KR2015/001767, dated May 21, 2015.

*Primary Examiner* — Yalkew Fantu
(74) *Attorney, Agent, or Firm* — Birch, Stewart, Kolasch & Birch, LLP

(57) ABSTRACT

Disclosed is a battery management unit for setting a communication identifier through the frequency of a start signal. The battery management unit according to the present invention analyzes the frequency of a received start signal. If the frequency of the start signal is a fundamental frequency, the battery management unit sets itself as a master unit. If the frequency of the start signal is not the fundamental frequency, the battery management unit sets itself as a slave unit. In addition, when outputting a start signal to another neighboring battery management unit, the battery management unit according to the present invention outputs the start signal by modulating the frequency of the start signal into a frequency produced by adding an additional frequency value to the frequency as received in the battery management unit. Thus, the battery management unit is
(Continued)

capable of setting the status of the battery management unit and also setting a communication identifier of the battery management unit by analyzing the value of the received frequency.

14 Claims, 2 Drawing Sheets

(52) U.S. Cl.
CPC ......... *H02J 7/0068* (2013.01); *B60L 2200/12* (2013.01); *B60L 2240/545* (2013.01); *B60L 2240/547* (2013.01); *B60L 2240/549* (2013.01); *Y02T 90/16* (2013.01)

(58) Field of Classification Search
USPC .......................................................... 320/128
See application file for complete search history.

(56) References Cited

U.S. PATENT DOCUMENTS

2007/0090793 A1* 4/2007 Eguchi .................... G06F 1/263 320/112
2010/0173180 A1* 7/2010 Li ......................... H02J 7/0021 429/50
2011/0273023 A1 11/2011 Nishida et al.
2012/0166841 A1 6/2012 Holsen et al.
2013/0249475 A1 9/2013 Kang et al.
2013/0285616 A1* 10/2013 Washiro ................ H01M 10/44 320/134
2014/0091770 A1 4/2014 Lee et al.

FOREIGN PATENT DOCUMENTS

KR 10-2013-0079931 A 7/2013
WO WO 2012/165858 A2 12/2012
WO WO 2013/125860 A1 8/2013

* cited by examiner

BATTERY MANAGEMENT UNIT AND METHOD FOR SETTING IDENTIFIER BY USING FREQUENCY MODULATION

TECHNICAL FIELD

The present disclosure relates to a battery management apparatus for setting an identifier and its method, and more particularly, to a battery management apparatus for setting its status in a multi-battery management apparatus having a master-slave structure and its method.

The present application claims priority to Korean Patent Application No. 10-2014-0021282 filed in the Republic of Korea on Feb. 24, 2014 and Korean Patent Application No. 10-2015-0025 843 filed in the Republic of Korea on Feb. 24, 2015, the disclosures of which are incorporated herein by reference.

BACKGROUND ART

Due to its characteristics of being easily applicable to various products and electrical characteristics such as a high energy density, a secondary battery is not only commonly applied to a portable device, but universally applied to an electric vehicle (EV) or a hybrid vehicle (HV), and an energy storage system that drive on an electric driving source. This secondary battery is gaining attention for its primary advantage of remarkably reducing the use of fossil fuels and not generating by-products from the use of energy, making it a new eco-friendly and energy efficient source of energy.

A battery pack used in the electric vehicle has a structure in which a plurality of cell assemblies is connected in series, each cell assembly including a plurality of unit cells, to obtain high output. Also, the unit cell can be charged and discharged repeatedly by electrochemical reactions between elements including a positive current collector, a negative current collector, a separator, an active material and an electrolyte solution.

In addition to this basic structure, the battery pack further includes a battery management unit (BMU) to monitor and control a state of a secondary battery by applying an algorithm for control of power supply to a driving load such as a motor, measurement of electrical characteristic values such as current and voltage, charge/discharge control, voltage equalization control, and estimation of a state of charge (SOC).

Recently, with the growing need for a high-capacity structure as well as utilization as an energy storage source, there is an increasing demand for a battery pack with a multi-module structure in which a plurality of battery modules including a plurality of batteries connected in series and/or in parallel are assembled.

Because the battery pack with a multi-module structure includes a plurality of batteries, there is a limitation in controlling the charge/discharge state of all the batteries using a single BMU. Accordingly, a recent technology has been introduced in which a BMU is mounted in each battery module included in the battery pack, one of the BMUs is designated as a mater BMU and the other BMUs are designated as a slave BMS, such that the charge and discharge of each battery module is controlled in a master-slave mode.

Japanese Patent Publication No. 2010-141971 discloses an example of earlier technology relating to the master-slave mode. The prior art discloses wherein a BMU designed to have a master status originally transmits a wakeup signal to a BMU designed to have a slave status originally.

However, earlier technology such as the above needs to make a double effort to produce a BMU having a master status and a BMU having a slave status separately and develop suitable algorithms for each status. Further, when an operation such as replacement/addition of an existing battery pack is required, setting an identifier in accordance with the status of the replaced/added BMU is complex.

DISCLOSURE

Technical Problem

The present disclosure is designed to solve the problem of the related art, and therefore the present disclosure is directed to providing a battery management unit for setting an identifier by using a simple algorithm and its method.

Technical Solution

To achieve the object, a battery management unit according to the present disclosure includes a first terminal and a second terminal which are connectable with a serial communication line, a memory unit which stores a fundamental frequency of a wakeup signal, and a control unit which sets a status of the control unit as a master unit when frequency of a wakeup signal received through the first terminal corresponds to the fundamental frequency stored in the memory unit.

The control unit according to the present disclosure may set a status of the control unit as a slave unit when frequency of the wakeup signal received through the first terminal fails to correspond to the fundamental frequency stored in the memory unit.

The memory unit according to the present disclosure further stores an additional frequency value. In this case, the control unit may output the wakeup signal having a sum of the frequency of the wakeup signal received through the first terminal and the additional frequency value stored in the memory unit through the second terminal after the control unit sets the status of the control unit.

The control unit according to the present disclosure may set a communication identifier of the control unit by determining how many numbers of additional frequency values are added to the fundamental frequency in the frequency of the wakeup signal received through the first terminal.

The battery management unit according to the present disclosure may be a component of a battery management system including a plurality of battery management units and a serial communication line which connects the plurality of battery management units.

According to an embodiment of the present disclosure, the serial communication line is a daisy chain.

The battery management system according to the present disclosure may be a component of a battery pack including a battery management system and a plurality of secondary batteries electrically connected so that charge and discharge is controlled by the battery management system.

The battery pack according to the present disclosure may be a component of a battery operating system including a battery pack and a load which is supplied with power from the battery pack. In this case, the load may further include an external control unit connected to one end of the serial communication line included in the battery pack. Also, the external control unit may output the wakeup signal having the fundamental frequency through the serial communication line. On the other hand, the load may be an electrically-driven means or a mobile device.

To achieve the object, a method for setting a communication identifier of a battery management unit according to the present disclosure is a method by which a battery management unit including a first terminal and a second terminal connectable with a serial communication line, a memory unit storing a fundamental frequency of a wakeup signal and a control unit sets a communication identifier of the battery management unit, and the method includes (a) determining, by the control unit, whether frequency of a wakeup signal received through the first terminal corresponds to the fundamental frequency stored in the memory unit, and (b) setting, by the control unit, a status of the control unit as a master unit when the frequency of the wakeup signal received through the first terminal corresponds to the fundamental frequency.

According to an embodiment of the present disclosure, the step (b) further includes setting, by the control unit, a status of the control unit as a slave unit when the frequency of the wakeup signal received through the first terminal fails to correspond to the fundamental frequency stored in the memory unit.

The memory unit of the battery management unit may further store an additional frequency value. In this case, the method for setting a communication identifier according to the present disclosure may further include (c) outputting, by the control unit, the wakeup signal having a sum of the frequency of the wakeup signal received through the first terminal and the additional frequency value stored in the memory unit through the second terminal after the control unit sets the status of the control unit.

The method for setting a communication identifier according to the present disclosure may further include (d) setting, by the control unit, a communication identifier of the control unit by determining how many numbers of additional frequency values are added to the fundamental frequency in the frequency of the wakeup signal received through the first terminal.

Advantageous Effects

According to an aspect of the present disclosure, it is possible to automatically set the status of battery management units through frequency modulation of a wakeup signal.

According to another aspect of the present disclosure, there is no need to separately produce a battery management unit or mount a separate algorithm in accordance with the status. Accordingly, production of a battery management unit is easy and configuration of a battery management system is easy.

According to still another aspect of the present disclosure, it is possible to add or replace a new battery management unit by using a simple operation.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
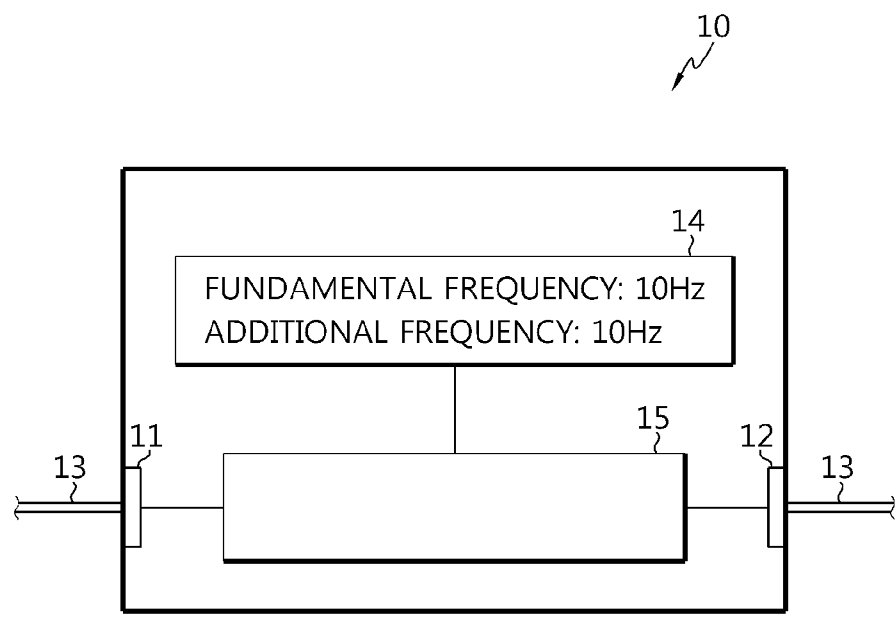
FIG. 1 is a block diagram in outline showing the architecture of a battery management unit according to an embodiment of the present disclosure.

FIG. 1 is a block diagram in outline showing the architecture of a battery management unit 10 according to an embodiment of the present disclosure.

Referring to FIG. 1, the battery management unit 10 according to the present disclosure includes a first terminal 11, a second terminal 12, a memory unit 14, and a control unit 15.

The first terminal 11 and the second terminal 12 may be connected with a serial communication line 13. The control unit 15 receives a signal for waking up the battery management unit 10 through the first terminal 11, and the control unit 15 outputs a signal for waking up other battery management unit through the second terminal 12.

For reference, under normal conditions, the battery management unit 10 stands by in sleep state and when receiving a signal from a unit having high level status (e.g.: a master unit or an external control unit), it starts to awaken. In this instance, the signal which causes the battery management unit 10 to start to wake up is a 'wakeup signal'.

The serial communication line 13 represents a connection architecture in which a receiver receiving a signal becomes a transmitter and delivers the signal to another adjacent receiver connected thereto by a relay scheme.

The first terminal 11 and the second terminal 12 refer to two terminals connected with the serial communication line 13. As described herein, each battery management unit 10 receives the wakeup signal through the first terminal 11, and other battery management unit connected through the serial communication line transmits the wakeup signal through the second terminal 12. However, the 'first' and 'second' are the terms for distinguishing two terminals connected with the serial communication line 13, and they do not denote location/function/communication sequence/priority.

The memory unit 14 stores a fundamental frequency of the wakeup signal.

The control unit 15 determines whether the frequency of the wakeup signal received through the first terminal 11 corresponds to the fundamental frequency stored in the memory unit 14. Also, when the frequency of the wakeup signal corresponds to the fundamental frequency, the control unit 15 sets its status as a master unit.

In contrast, when the frequency of the wakeup signal received through the first terminal 11 does not correspond to the fundamental frequency stored in the memory unit 14, the control unit 15 sets its status as a slave unit.

On the other hand, the memory unit 14 may further store an additional frequency value.

After the control unit 15 sets its status (master or slave), the control unit 15 outputs, through the second terminal 12, the wakeup signal with the sum of the frequency of the wakeup signal received through the first terminal 11 and the additional frequency value stored in the memory unit 14.

Further, the control unit 15 may set its communication identifier by determining how many numbers of additional frequency values are added to the fundamental frequency in the frequency of the wakeup signal received through the first terminal 11.

According to an embodiment, to allow the control unit 15 to determine whether the frequency value of the wakeup signal inputted to the first terminal 11 corresponds to the fundamental frequency and how many times the additional frequency was added to the fundamental frequency, the battery management unit 10 may further include a frequency analyzer. The frequency analyzer may analyze the frequency of the inputted wakeup signal through various methods. For example, the frequency analyzer may determine a frequency value having a highest power value as the frequency of the wakeup signal by analyzing power value profile for each frequency of the wakeup signal.

Furthermore, according to an embodiment, to allow the control unit 15 to output the wakeup signal added with the additional frequency value through the second terminal 12, the battery management unit 10 may further include a frequency generator. The frequency generator may generate a frequency corresponding to a frequency value equal to the sum of the fundamental frequency and a predetermined number of additional frequency values. Through this, the wakeup signal having a desired frequency value may be outputted through the second terminal 12.

According to another embodiment, the battery management unit 10 may further include a frequency modulator. The frequency modulator may modulate the frequency value of the wakeup signal received through the first terminal 11 to a frequency corresponding to a frequency value added with a predetermined number of additional frequency values. Through this, the wakeup signal having a desired frequency value may be outputted through the second terminal 12.

For better understanding of the battery management unit 10 according to the present disclosure, a description will be provided through a battery management system including a plurality of battery management units and a serial communication line connecting the plurality of battery management units.

Figure 2:
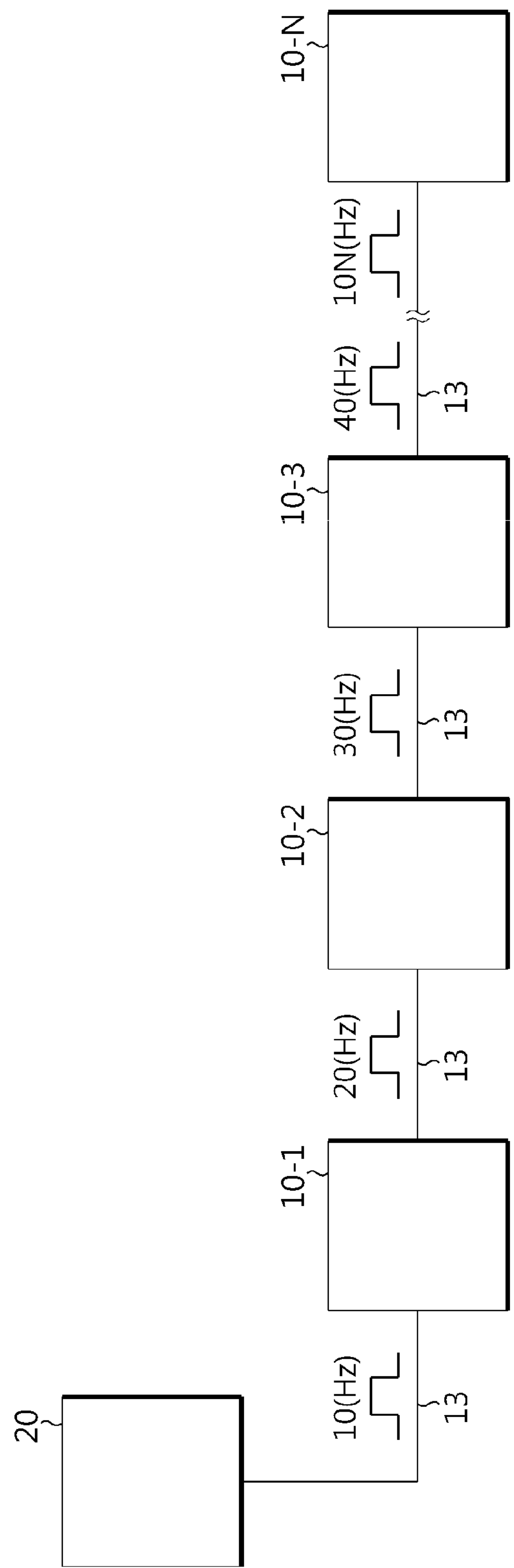
FIG. 2 is a block diagram in outline showing the architecture of a battery management system according to an embodiment of the present disclosure.

FIG. 2 is a block diagram in outline showing the architecture of a battery management system according to an embodiment of the present disclosure.

Referring to FIG. 2, N battery management units 10 according to the present disclosure are connected to each other through the serial communication line 13.

The serial communication line may be a daisy chain. The daisy chain refers to a bus wiring scheme in which multiple devices are connected in sequence. Dissimilar to simple bus connection, the daisy chain supports a signal transmission method by which one device in the chain may transmit a signal to other device by a relay scheme. Although all devices connected with the daisy chain can transmit a same signal, a device which received the signal can modulate and transmit the signal to other device.

For the convenience of understanding, assume that the battery management system is a component of a battery pack including the battery management system and a plurality of secondary batteries (not shown) electrically connected to each other so that charge and discharge is controlled by the battery management system.

The battery pack may be a component of a battery operating system including the battery pack and a load which is supplied with power from the battery pack.

The battery operating system may include, for example, an electric vehicle (EV), a hybrid electric vehicle (HEV), an electric bike (E-Bike), a power tool, an energy storage system, an uninterruptible power supply (UPS), a portable computer, a mobile phone, a portable audio device and a portable video device, and the load may include, for example, a motor that generates a rotational force by power supplied from the battery pack, or a power converter circuit that converts power supplied from the battery pack to power required for various circuit components.

For the convenience of understanding, an electric vehicle (EV) is selected from the listed examples and a description will be provided based on such selection. The electric vehicle has a central controller to control many components of the electric vehicle. The central controller may control the battery pack. Accordingly, the central controller is connected to one end of the serial communication line 13 included in the battery pack. On the position of the battery management unit 10, the central controller is recognized as an external control unit 20 because the central controller controls the battery pack.

The external control unit 20 outputs a wakeup signal having a fundamental frequency through the serial communication line 13. For example, the fundamental frequency is 10 Hz.

Among the battery management units, a battery management unit 10-1 directly connected to the external control unit 20 through the serial communication line 13 receives a wakeup signal. In this instance, because the frequency of the received wakeup signal corresponds to the fundamental frequency stored in the memory unit 14, the battery management unit 10-1 sets itself as a master unit. Also, the battery management unit 10-1 outputs the wakeup signal added with the additional frequency value stored in the memory unit 14 to the serial communication line 13. For example, the additional frequency value is 10 Hz. Thus, the battery management unit 10-1 outputs the wakeup signal having the frequency of 20 Hz to a battery management unit 10-2 connected on the right side.

Because the frequency of the received wakeup signal does not correspond to the fundamental frequency stored in the memory unit 14, the battery management unit 10-2 sets its status as a slave unit. Also, the battery management unit 10-2 outputs the wakeup signal added with the additional frequency value to the serial communication line 13. Thus, the battery management unit 10-2 outputs the wakeup signal having the frequency of 30 Hz to a battery management unit 10-3 connected on the right side.

Of course, because the frequency of the received wakeup signal does not correspond to the fundamental frequency stored in the memory unit 14, the battery management unit 10-3 sets its status as a slave unit.

Through the frequency modulation of the wakeup signal such as above, it is possible to automatically set the status of the battery management units 10.

Further, as mentioned above, each battery management unit 10 can set its communication identifier by determining how many numbers of additional frequency values are added to the fundamental frequency in the frequency of the received wakeup signal. For example, each battery management unit 10 may recognize the number of frequencies added as its communication identifier. More specifically, as the frequency of the wakeup signal received by the battery management unit 10-2 is 20 Hz, a frequency value added to the fundamental frequency of 10 Hz is 10 Hz. Because the additional frequency value was added once, the battery management unit 10-2 sets its communication identifier as 'slave-1'. Because the added frequency value is 20 Hz (added twice), the battery management unit 10-3 sets its communication identifier as 'slave-2'. Because the added frequency value is 30 Hz (added three times), the battery management unit 10-3 sets its communication identifier as 'slave-3'. In this way, the battery management unit 10 can set a communication identifier without an overlap. The communication identifier 'slave-1, slave-2 slave-3' is an identifier arbitrarily set for the convenience of understanding, and does not limit the present disclosure. Accordingly, the present disclosure can set various types of identifiers.

On the other hand, to execute various control logics described in the foregoing, the control unit 15 may include a processor, an application-specific integrated circuit (ASIC), other chipset, a logic circuit, a register, a communication modem and a data processing device, known in the art pertaining to the present disclosure. Also, when the above-mentioned control logics are implemented as software, the control unit 15 may be implemented as an assembly of program modules. In this instance, the program module may be stored in the memory unit 14 and executed by the processor.

On the other hand, the memory unit 14 may be inside or outside of the control unit 15, and may be connected to the control unit 15 by a variety of well-known means. The memory unit 14 corresponds to a high-capacity storage medium such as known semiconductor devices or hard disk that is known as being capable of recording and erasing data, for example, random access memory (RAM), read-only memory (ROM) and electrical erasable programmable read-only memory (EEPROM), and encompasses any device capable of storing information regardless of a device type and does not indicate a particular memory device.

On the other hand, to perform the function as the battery management unit 10, the control unit 15 can various control functions on the ordinary level including measurement of electrical characteristic values including voltage or current of a secondary battery, charge/discharge control, voltage equalization control, and estimation of a state of charge (SOC). Also, the control unit 15 may transmit the state of a secondary battery for which the control unit 15 takes responsibility to a unit of higher level than the control unit 15 (a master unit or an external control unit), or receive a control signal associated with the charge and discharge of the secondary battery from the high level unit through the serial communication line 13.

Meanwhile, in the description of the present disclosure, it should be understood that each element or component of the present disclosure shown in FIGS. 1 and 2 is distinguished logically rather than physically.

That is, each element or component corresponds to a logic element or component to realize the technical aspects of the present disclosure, and accordingly, it should be construed that even though each element or component is integrated or separated, it falls within the scope of the present disclosure provided that a function performed by the logic element or component of the present disclosure can be implemented, and it falls within the scope of the present disclosure regardless of whether names are identical or not if it is an element or component performing an identical or similar function.

While the present disclosure has been hereinabove described in connection with a limited number of embodiments and drawings, the present disclosure is not limited thereto, and it should be understood that various modifications and changes may be made by those skilled in the art within the technical aspects of the invention and the equivalent scope to the appended claims.

What is claimed is:

1. A battery management unit, comprising:
- a first terminal and a second terminal which are connectable with a serial communication line;
- a memory unit which stores a fundamental frequency of a wakeup signal; and
- a control unit which sets a status of the control unit as a master unit when frequency of a wakeup signal received through the first terminal corresponds to the fundamental frequency stored in the memory unit.

2. The battery management unit according to claim 1, wherein the control unit sets a status of the control unit as a slave unit when frequency of the wakeup signal received through the first terminal fails to correspond to the fundamental frequency stored in the memory unit.

3. The battery management unit according to claim 2, wherein the memory unit further stores an additional frequency value, and
- the control unit outputs the wakeup signal having a sum of the frequency of the wakeup signal received through the first terminal and the additional frequency value stored in the memory unit through the second terminal after the control unit sets the status of the control unit.

4. The battery management unit according to claim 3, wherein the control unit sets a communication identifier of the control unit by determining how many numbers of additional frequency values are added to the fundamental frequency in the frequency of the wakeup signal received through the first terminal.

5. A battery management system, comprising:
- a plurality of the battery management units according to claim 4; and
- a serial communication line which connects the plurality of battery management units.

6. The battery management system according to claim 5, wherein the serial communication line is a daisy chain.

7. A battery pack, comprising:
- the battery management system according to claim 5; and
- a plurality of secondary batteries electrically connected so that charge and discharge is controlled by the battery management system.

8. A battery operating system, comprising:
- the battery pack according to claim 7; and
- a load which is supplied with power from the battery pack.

9. The battery operating system according to claim 8, wherein the load further comprises an external control unit connected to one end of the serial communication line included in the battery pack, and
- the external control unit outputs the wakeup signal having the fundamental frequency through the serial communication line.

10. The battery operating system according to claim 9, wherein the load is an electrically-driven means or a mobile device.

11. A method for setting a communication identifier of a battery management unit, the battery management unit comprising a first terminal and a second terminal connectable with a serial communication line, a memory unit storing a fundamental frequency of a wakeup signal, and a control unit, the method comprising:

(a) determining, by the control unit, whether frequency of a wakeup signal received through the first terminal corresponds to the fundamental frequency stored in the memory unit; and (b) setting, by the control unit, a status of the control unit as a master unit when the frequency of the wakeup signal received through the first terminal corresponds to the fundamental frequency.

12. The method for setting a communication identifier of a battery management unit according to claim 11, wherein the step (b) further comprises setting, by the control unit, a status of the control unit as a slave unit when the frequency of the wakeup signal received through the first terminal fails to correspond to the fundamental frequency stored in the memory unit.

13. The method for setting a communication identifier of a battery management unit according to claim 12, wherein the memory unit further stores an additional frequency value, and the method further comprises (c) outputting, by the control unit, the wakeup signal having a sum of the frequency of the wakeup signal received through the first terminal and the additional frequency value stored in the memory unit through the second terminal after the control unit sets the status of the control unit.

14. The method for setting a communication identifier of a battery management unit according to claim 13, further comprising:

(d) setting, by the control unit, a communication identifier of the control unit by determining how many numbers of additional frequency values are added to the fundamental frequency in the frequency of the wakeup signal received through the first terminal.

* * * * *